(12) United States Patent
Kim et al.

(10) Patent No.: US 7,372,794 B2
(45) Date of Patent: May 13, 2008

(54) COMPATIBLE OPTICAL PICKUP APPLYING TILT TO OBJECTIVE LENS IN PROPORTION TO RADIAL MOVEMENT OF OBJECTIVE LENS

(75) Inventors: Tae-kyung Kim, Seoul (KR);
Chong-sam Chung, Gyeonggi-do (KR);
Young-man Ahn, Gyeonggi-do (KR);
Byung-in Ma, Gyeonggi-do (KR);
Jong-bae Kim, Seoul (KR); Seok-jung Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 696 days.

(21) Appl. No.: 10/454,838

(22) Filed: Jun. 5, 2003

(65) Prior Publication Data

US 2004/0032815 A1 Feb. 19, 2004

(30) Foreign Application Priority Data

Jun. 5, 2002 (KR) .................... 10-2002-0031491

(51) Int. Cl.
*G11B 7/09* (2006.01)
(52) U.S. Cl. ................... 369/53.19; 369/112.26
(58) Field of Classification Search ..................... None
See application file for complete search history.

(56) References Cited

U.S. PATENT DOCUMENTS 2,233,591 A  3/1941  Dulovits
3,305,294 A  2/1967  Alverez
3,958,884 A  5/1976  Smith
4,074,314 A  2/1978  Velzel et al.
4,210,391 A  7/1980  Cohen
4,266,534 A  5/1981  Ogawa (Continued)

FOREIGN PATENT DOCUMENTS

EP  0 587 297  3/1994

(Continued)

OTHER PUBLICATIONS

Translation of JP 10-003671 (Sukiyama, Hiroyuki) provided by the JPO website.*

(Continued)

*Primary Examiner*—Andrea Wellington
*Assistant Examiner*—Michael V Battaglia
(74) *Attorney, Agent, or Firm*—Stein, McEwen & Bui, LLP

(57) ABSTRACT

A compatible optical pickup compatibly using a high density recording medium and at least one low density recording medium, includes an objective lens to form a light spot suitable for use on a recording surface of the high density recording medium by focusing a corresponding incident light beam with a high NA suitable for the high density recording medium and a light spot suitable for use on another recording surface of the low density recording medium by focusing another corresponding incident light beam, and an actuator provided to apply tilt to the objective lens. The light beam for the low density recording medium is incident on the objective lens as a divergent beam. When the objective lens is shifted in a radial direction, a tilt is applied to the objective lens corresponding to the shift.

10 Claims, 9 Drawing Sheets

U.S. PATENT DOCUMENTS

| | | |
|---|---|---|
| 4,340,283 A | 7/1982 | Cohen |
| 4,501,493 A | 2/1985 | Kubota |
| 4,545,653 A | 10/1985 | Brenden et al. |
| 4,566,762 A | 1/1986 | Kato |
| 4,612,437 A | 9/1986 | Ohsato |
| 4,631,397 A | 12/1986 | Ohsato et al. |
| 4,733,943 A | 3/1988 | Suzuki et al. |
| 4,741,605 A | 5/1988 | Alfredsson et al. |
| 4,904,856 A | 2/1990 | Nagahama et al. |
| 4,918,679 A | 4/1990 | Opheij et al. |
| 4,929,823 A | 5/1990 | Kato et al. |
| 4,938,573 A | 7/1990 | Saito |
| 4,995,714 A | 2/1991 | Cohen |
| 4,995,715 A | 2/1991 | Cohen |
| 5,097,464 A | 3/1992 | Nishiuchi et al. |
| 5,120,120 A | 6/1992 | Cohen et al. |
| 5,132,843 A | 7/1992 | Aoyama et al. |
| 5,142,411 A | 8/1992 | Fiala |
| 5,153,778 A | 10/1992 | Sasian-Alvarado |
| 5,161,040 A | 11/1992 | Yokoyama et al. |
| 5,161,148 A | 11/1992 | Hori et al. |
| 5,164,584 A | 11/1992 | Wike, Jr. et al. |
| 5,195,072 A | 3/1993 | Fukui et al. |
| 5,231,624 A | 7/1993 | Finegan |
| 5,235,581 A | 8/1993 | Miyagawa et al. |
| 5,281,797 A | 1/1994 | Tatsuno et al. |
| 5,303,221 A | 4/1994 | Maeda et al. |
| 5,345,072 A | 9/1994 | Hayashi et al. |
| 5,349,471 A | 9/1994 | Morris et al. |
| 5,386,319 A | 1/1995 | Whitney |
| 5,438,187 A | 8/1995 | Reddersen et al. |
| 5,446,565 A | 8/1995 | Komma et al. |
| 5,473,471 A | 12/1995 | Yamagata |
| 5,496,995 A | 3/1996 | Kato et al. |
| 5,513,158 A | 4/1996 | Ohsato |
| 5,526,338 A | 6/1996 | Hasman et al. |
| 5,583,843 A | 12/1996 | Horinouchi |
| 5,587,981 A | 12/1996 | Kamatani |
| 5,612,942 A | 3/1997 | Takahashi |
| 5,615,199 A | 3/1997 | Tatsuno et al. |
| 5,615,200 A | 3/1997 | Hoshino et al. |
| 5,636,190 A | 6/1997 | Choi |
| 5,638,353 A | 6/1997 | Takahashi |
| 5,659,533 A | 8/1997 | Chen et al. |
| 5,665,957 A | 9/1997 | Lee et al. |
| 5,696,750 A | 12/1997 | Katayama |
| 5,703,856 A | 12/1997 | Hayashi et al. |
| 5,703,862 A | 12/1997 | Lee et al. |
| 5,708,638 A | 1/1998 | Braat et al. |
| 5,717,674 A | 2/1998 | Mori et al. |
| 5,724,335 A | 3/1998 | Kobayashi |
| 5,734,512 A | 3/1998 | Shin et al. |
| 5,734,637 A | 3/1998 | Ootaki et al. |
| 5,737,300 A | 4/1998 | Ota et al. |
| 5,754,512 A | 5/1998 | Komma et al. |
| 5,768,242 A | 6/1998 | Juday |
| 5,777,803 A | 7/1998 | Ju et al. |
| 5,777,973 A | 7/1998 | Yoo et al. |
| 5,790,503 A | 8/1998 | Mizuno et al. |
| 5,793,734 A * | 8/1998 | Tsuchiya et al. ............ 369/118 |
| 5,796,683 A | 8/1998 | Sumi et al. |
| 5,815,293 A | 9/1998 | Komma |
| 5,822,135 A | 10/1998 | Lee et al. |
| 5,844,879 A | 12/1998 | Morita et al. |
| 5,881,034 A | 3/1999 | Mano et al. |
| 5,909,424 A | 6/1999 | Lee et al. |
| 5,917,800 A | 6/1999 | Choi |
| 5,930,214 A | 7/1999 | Kasahara et al. |
| 5,933,401 A * | 8/1999 | Lee et al. ............... 369/112.21 |
| 5,982,732 A | 11/1999 | Yamanaka |
| 5,986,779 A | 11/1999 | Tanaka |
| 6,043,912 A | 3/2000 | Yoo et al. |
| 6,052,237 A | 4/2000 | Opheij et al. |
| 6,285,645 B1 | 9/2001 | Shimozono |
| 6,343,058 B1 * | 1/2002 | Akiyama et al. ......... 369/112.1 |
| 6,345,029 B1 | 2/2002 | Lee et al. |
| 6,449,235 B1 | 9/2002 | Kim et al. |
| 6,466,529 B1 | 10/2002 | Kim et al. |
| 6,501,710 B2 * | 12/2002 | Yokoyama et al. ....... 369/44.14 |
| 6,507,544 B1 | 1/2003 | Ma et al. |
| 6,545,958 B1 * | 4/2003 | Hirai et al. ............... 369/44.32 |
| 6,549,493 B1 * | 4/2003 | Nakamura et al. ........ 369/44.32 |
| 6,650,612 B1 * | 11/2003 | Matsuzaki et al. ...... 369/112.05 |
| 6,950,383 B2 * | 9/2005 | Kimura .................. 369/112.02 |
| 2002/0181366 A1 * | 12/2002 | Katayama ................... 369/53.2 |
| 2003/0053392 A1 * | 3/2003 | Jeong ...................... 369/112.1 |
| 2003/0185136 A1 * | 10/2003 | Kaiho et al. ............ 369/112.22 |
| 2005/0237900 A1 * | 10/2005 | Sano et al. ............. 369/112.08 |

FOREIGN PATENT DOCUMENTS

| | | |
|---|---|---|
| EP | 0 747 893 | 12/1996 |
| EP | 0 803 867 | 10/1997 |
| EP | 0 838 812 | 4/1998 |
| EP | 0 953 974 | 11/1999 |
| EP | 1 085 509 | 3/2001 |
| EP | 1 096 481 | 5/2001 |
| EP | 1 178 474 | 2/2002 |
| GB | 508448 | 6/1939 |
| JP | 62-73429 | 4/1987 |
| JP | 2-118508 | 5/1990 |
| JP | 3-244450 | 10/1991 |
| JP | 04-178931 | 6/1992 |
| JP | 05-81698 | 4/1993 |
| JP | 5-242520 | 9/1993 |
| JP | 06-96466 | 4/1994 |
| JP | 6-259804 | 9/1994 |
| JP | 7-65407 | 3/1995 |
| JP | 07-98431 | 4/1995 |
| JP | 07-302437 | 11/1995 |
| JP | 07-311969 | 11/1995 |
| JP | 8-36768 | 2/1996 |
| JP | 8-55363 | 2/1996 |
| JP | 8-62493 | 3/1996 |
| JP | 8-36768 | 6/1996 |
| JP | 8-240718 | 9/1996 |
| JP | 10-3671 | 1/1998 |
| JP | 10-79138 | 3/1998 |
| JP | 10-97753 | 4/1998 |
| JP | 11-328719 | 11/1999 |
| JP | 2000-187870 | 7/2000 |
| JP | 2001-43559 | 2/2001 |
| JP | 2001-11074 | 4/2001 |
| JP | 2002-298352 | 10/2002 |
| KR | 1999-019439 | 3/1999 |
| KR | 1999-45847 | 10/1999 |
| KR | 2001-38041 | 5/2001 |
| WO | WO 98/19303 | 5/1998 |
| WO | WO 01/09885 | 2/2001 |

OTHER PUBLICATIONS

Y. Komma et al., "Dual focus optical head for 0.6mm and 1.2mm disks," Optical Data Storage, SPIE vol. 2338, 1994, pp. 282-288.

Patent Abstract of Japan for Japanese Publication No. 2001-1273659, published Oct. 5, 2001.

Hendriks, B. H. W., et al.: "Single Digital Video Recording/Digital Versatile Disk Objective and Plastic Digital Video Recording Objective," *Japanese J. Appl. Phys.* vol. 41, No. 3B, Mar. 2002, pp. 1791-1797.

Katayama et al.: "Dual Wavelength Optical Head for 0.6 mm and 1.2 mm Substrate Thickness," Japanese Journal of Applied Physics, vol. 36, Part 1, No. 1B, pp. 460-466.

Doh et al.: "Radial Tilt Detection Using One Beam and Its Compensation in a High-Density Read Only Memory," Japanese Journal of Applied Physics, vol. 40, No. 3B, part 1, pp. 1680-1683.

Narahara et al.: "Optical Disc System for Digital Video Recording," Japanese Journal of Applied Physics, vol. 39, No. 2B, part 1, pp. 912-919.

M. Shinoda et al., "Objective Lenses for DVD," IEEE Transactions on Consumer Electronics, vol. 42, No. 3, pp. 808-813 (Aug. 1996).

Takagi et al., "DVD/CD Compatible Pick-up with Liquid Crystal Shutter," IEEE (1997).

Narahara et al.: "Optical Disc System for Digital Video Recording," Japanese Journal of Applied Physics, vol. 39, No. 2B, part 1, pp. 912-919. (Previously cited in IDS filed Mar. 3, 2004).

\* cited by examiner

COMPATIBLE OPTICAL PICKUP APPLYING TILT TO OBJECTIVE LENS IN PROPORTION TO RADIAL MOVEMENT OF OBJECTIVE LENS

CROSS-REFERENCE TO RELATED APPLICATION

This application claims the benefit of Korean Patent Application No. 2002-31491, filed on Jun. 5, 2002 in the Korean Intellectual Property Office, the disclosure of which is incorporated herein in its entirety by reference.

BACKGROUND OF THE INVENTION

1. Field of the Invention

The present invention relates to a compatible optical pickup, and more particularly, to a compatible optical pickup which can correct a spherical aberration generated due to the difference in thickness between recording media by using a divergent light beam with respect to a recording medium having a thickness deviated from optimal design conditions of an objective lens.

2. Description of the Related Art

In general, an optical recording and/or reproducing apparatus records information on or reproduces information from an optical disc by using a light spot focused by an objective lens. In the optical recording and/or reproducing apparatus, a recording capacity of the optical disc is determined by a size S of a light spot formed by the optical recording and/or reproducing apparatus. The size S of a light spot is proportional to the wavelength λ of a light beam and is inversely proportional to the numeric aperture (NA) of the objective lens, as shown in Mathematical Formula 1 below.

$$S \propto \lambda / NA \quad \text{Mathematical Formula 1}$$

Thus, to reduce the size S of the light spot formed on the optical disc so as to increase the density of the optical disc, it is necessary to use a short wavelength light source, such as a blue-violet laser, and to use an objective lens having an NA of 0.6 or more.

Also, when the inclination angle, refractive index, and thickness of an optical disc is θ, n, and d, respectively, and the numerical aperture of the objective lens is NA, a coma aberration $W_{31}$ generated by the inclination of the optical disc can be expressed in Mathematic Formula 2 below.

$$W_{31} = -\frac{d}{2} \frac{n^2(n^2-1)\sin\theta\cos\theta}{(n^2-\sin^2\theta)^{5/2}} NA^3 \quad \text{Mathematical Formula 2}$$

Here, the refractive index n and thickness d of the optical disc indicate the refractive index and thickness of an optical medium from a light incident surface to a recording surface, respectively.

In consideration of Mathematical Formula 2, the thickness of the optical disc needs to be reduced in order to secure allowance with respect to the inclination of the optical disc while allowing the NA of the objective lens to be increased to provide higher density discs.

The thickness of the optical disc has been reduced from 1.2 mm in a compact disc (CD) to 0.6 mm in a digital versatile disc (DVD). In the future, the thickness will probably be reduced to 0.1 mm in a next generation DVD, a so-called HD-DVD (high density digital versatile disc) whose density is higher than the DVD. Of course, the NA of the objective lens has increased from 0.45 in the CD to 0.6 in the DVD. In the next generation DVD (i.e., the HD-DVD), the NA of the objective lens will probably be more than 0.6 and could be, for example, 0.85. Also, considering the recording capacity, it is highly likely the next generation DVD will use a blue-violet light source. Here, the compatibility with the existing optical discs is considered in the development of optical discs having new specifications.

For example, since the reflectivity of a DVD-R or a CD-R, which can record once, is sharply reduced according to a wavelength, it is necessary to use light sources having a wavelength of 650 nm and 780 nm. Thus, considering compatibility with the DVD-R and/or CD-R, an optical pickup for the next generation DVD needs to use two or three light sources having different wavelengths. When a compatible optical pickup uses a plurality of light sources having different wavelengths, it is preferable to use a single objective lens considering a variety of merits such as the size, easiness in assembly, and cost of an apparatus. When optical discs having different thicknesses are compatibly recorded and/or reproduced with a single objective lens, a spherical aberration is generated due to the difference in thickness between the optical discs. Thus, the compatible optical pickup should correct the spherical aberration so that optical discs having different thicknesses can be recorded and/or reproduced by using a single objective lens only.

In Korean Patent Application No.1997-42819 and corresponding Korean Patent Publication No. 1999-19439, the present applicant has suggested a CD and DVD compatible optical pickup having an optical arrangement in which an objective lens is optimally designed with respect to a DVD. Thus, a first light beam having a wavelength of 650 nm for the DVD is incident on the objective lens as a parallel beam. A second light beam having a wavelength of 780 nm for a CD and having a thickness of a substrate out of a range of design conditions of the objective lens is incident on the objective lens as a divergent beam. As such, the spherical aberration due to the difference in thickness of a substrate between a DVD and a CD can be corrected when the CD is used. However, when the divergent beam is used as in the above device, during reproduction of an eccentric optical disc, the coma aberration is greatly generated when the objective lens is shifted in a radial direction of the optical disc. Thus, a tracking error signal and a reproduction signal are further deteriorated when reproducing the eccentric optical disc.

In the configuration of a compatible optical pickup capable of compatibly using a next generation DVD and an optical disc having a density lower than the next generation DVD (such as a CD and/or a DVD), while no such device has been created or suggested, assuming that the objective lens is designed to be suitable for the next generation DVD having the highest density and a divergent beam is used for the CD and/or DVD such that the spherical aberration can be corrected and working distance can be secured, an additional problem would remain. Specifically, when a divergent beam is used in an optical pickup for a next generation DVD family optical disc (hereinafter, referred to as the next generation DVD) as a method to compatibly use the existing DVD family optical disc (hereinafter, referred to as the DVD) and the CD family optical disc (hereinafter, referred to as the CD), although the spherical aberration due to the wavelength and the difference in thickness of the optical discs could be corrected, an optical path difference (OPD) would be created due to the shift of the objective lens in a radial direction of the optical disc when an eccentric optical disc is being reproduced. In particular, the coma aberration would be generated greatly. The created OPD deteriorates a tracking error signal and a reproduction signal.

That is, a high level of technology is required to design and manufacture an objective lens capable of using a next generation DVD, a DVD, and/or a CD as a single lens. Also, it is difficult to make long working distances to be the same as that of an objective lens for a DVD that is designed optimal to the DVD.

According to technology in the field to which the present invention pertains, the objective lens is typically designed to have a working distance of about 0.6 mm with respect to a blue-violet light source and a thickness of 0.1 mm. When light spots are formed on the recording surfaces of a DVD and a CD by focusing a light beam having a 650 nm wavelength for the DVD and a light beam having a 780 nm wavelength for the CD using the objective lens having a high NA designed to the thickness of 0.1 mm and the blue-violet light beam, the working distances are 0.32 mm and −0.03 mm, respectively. That is, the CD and the objective lens collide.

However, if the light source for a CD is arranged at a position deviated from a position of the focal point of a collimating lens (i.e., a position shorter than the focal length) so that the light beam having the 780 nm wavelength is incident on the objective lens in the form of a divergent beam, the working distance can be secured and the spherical aberration due to the difference in thickness between the next generation DVD and the CD and the difference in wavelength therebetween can be corrected. Also, when a light beam for the DVD is divergent when incident on the objective lens, the spherical aberration due to the difference in thickness between the next generation DVD and the DVD and the difference in wavelength therebetween can be corrected.

However, when the divergent beam is used for the CD and/or DVD, although it is possible to correct the spherical aberration and secure a sufficient working distance, the optical pickup becomes a finite optical system. Thus, when a shift of the objective lens in a radial direction of the optical disc is generated, such as when an eccentric optical disc is being recorded or reproduced, the coma aberration is greatly generated so that the aberration characteristic is abruptly deteriorated. In particular, the deterioration of the tracking signal and the reproduction signal becomes severe due to the coma aberration.

SUMMARY OF THE INVENTION

To solve the above and/or other problems, the present invention provides a compatible optical pickup which uses a divergent beam with respect to a low density optical disc so that a high density optical disc and a low density optical disc having different thicknesses can be compatibly used and a superior aberration characteristic can be obtained when an objective lens is shifted in a radial direction of the optical disc without additional optical elements.

Additional aspects and/or advantages of the invention will be set forth in part in the description which follows and, in part, will be obvious from the description, or may be learned by practice of the invention.

According to one aspect of the present invention, a compatible optical pickup compatibly using a high density recording medium and at least one lower density recording medium includes an objective lens having an optical property to form a light spot suitable for recording and/or reproduction on a recording surface of the high density recording medium by focusing a first incident light beam so as to obtain a high numerical aperture (NA) suitable for the high density recording medium and to form a light spot suitable for recording and/or reproduction on a recording surface of the lower density recording medium by focusing a second incident light beam for the low density recording medium; and an actuator provided to apply tilt to the objective lens, wherein the second light beam is incident on the objective lens in the form of the divergent beam, and when the objective lens is shifted in a radial direction with respect to the low density recording medium, a tilt is applied to the objective lens corresponding to the shift.

According to another aspect, the amount of inclination of the objective lens is proportional to a translational movement of the objective lens in the radial direction.

According to a further aspect, the amount of inclination of the objective lens is detected from current applied to a coil of the actuator to make the objective lens perform a translational movement in the radial direction.

According to an additional aspect, the tilt is a radial tilt.

According to still another aspect, the objective lens has an NA of 0.85 or more with respect to a blue-violet light beam and a thickness of 0.1 mm of a recording medium.

According to a still further aspect, the compatible optical pickup further comprises an NA adjusting member to adjust the NA with respect to the second light beam so that the second light beam has an effective NA suitable for the lower density recording medium.

According to a still additional aspect, the high density recording medium is a recording medium in a next generation DVD family having a density higher than that of a DVD, and the lower density recording medium is at least one of an optical disc in a CD family and an optical disc in a DVD family.

According to yet another aspect, the second light beam is at least one of a light beam having a red wavelength suitable for the optical disc in the DVD family and a light beam having a near infrared wavelength suitable for the optical disc in the CD family.

According to a yet additional aspect, the optical pickup further includes a photodetector to receive and detect a reflected second light beam reflected from the lower density recording medium, the photodetector being is divided into at least four sections in the radial direction of the recording medium to form a pair of inner light receiving portions and a pair of outer light receiving portions.

According to a yet additional aspect, the photodetector has a structure in which a baseball pattern portion of the light beam reflected and/or diffracted by the recording medium due to a periodic structure of the recording medium in a track direction is received only by the outer light receiving portions of the photodetector.

According to yet still another aspect, the photodetector further includes a first subtractor which subtracts detection signals from the inner light receiving portions to obtain a first subtracted signal, and a second subtractor which subtracts detection signals from the outer light receiving portions to obtain a second subtracted signal, and, when one of the first and second subtracted signals is PP1 and the other of the first and second subtracted signals is PP2, a tracking error signal TES is detected according to the following equation, $$TES = PP2 - \zeta \cdot PP1$$

wherein, $\zeta$ is a gain.

BRIEF DESCRIPTION OF THE DRAWINGS

The above and/or other features and advantages of the present invention will become more apparent and more readily appreciated by describing in detail embodiments thereof with reference to the accompanying drawings in which.

DETAILED DESCRIPTION OF THE EMBODIMENTS

Figure 1:
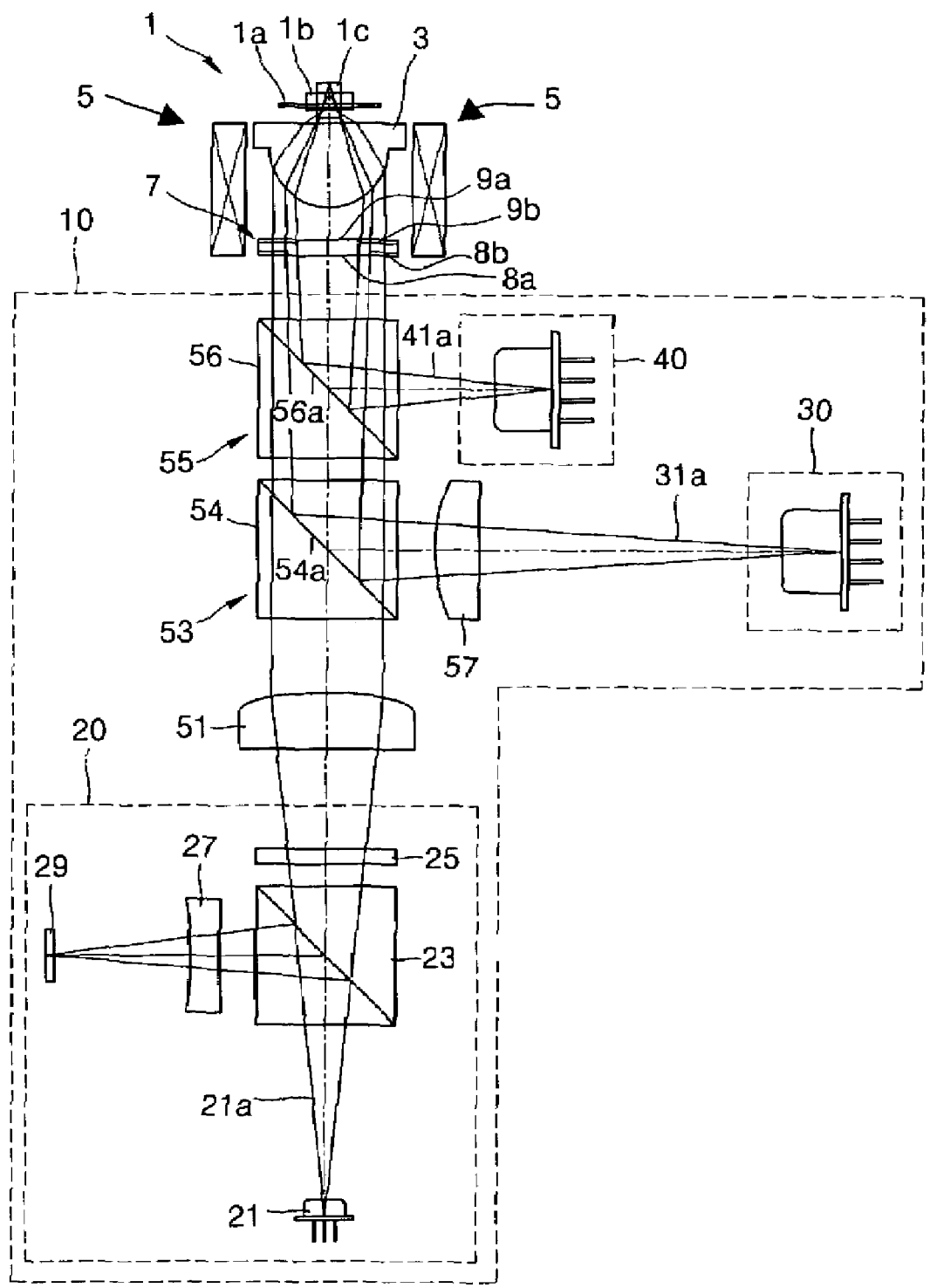
FIG. 1 schematically shows the optical configuration of a compatible optical pickup according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

To compatibly use a high density optical disc and a low density optical disc having corresponding different thicknesses, an embodiment of a compatible optical pickup according to the present invention includes a plurality of light sources. The light sources emit corresponding light beams having wavelengths suitable for the respective optical discs having different formats. The optical pickup further includes a single objective lens, and an actuator capable of making the objective lens tilt in a radial direction of the optical disc. The compatible optical pickup according to the present invention has an optical arrangement such that a divergent beam can be incident on the objective lens with respect to an optical disc having a thickness deviated from optimal design conditions of the objective lens. The compatible optical pickup is operated to apply radial tilt to the objective lens to correspond to the shift of the objective lens when the objective lens is shifted in the radial direction of the objective lens.

According to an embodiment of the compatible optical pickup of the present invention, since a divergent beam is used for the optical disc whose thickness is out of a range of the optimal design conditions of the objective lens, not only can spherical aberration due to the difference in thickness between the optical discs be corrected, but also a sufficient working distance can be secured so that the optical disc and the objective lens do not collide with each other. Also, when the objective lens is shifted in the radial direction, there is a restriction on the generation of aberration, in particular, coma aberration, so that superior tracking and reproduction signals can be detected. However, it is understood that other advantages and aspects can be obtained and realized using the compatible optical pickup of the present invention.

FIG. 1 schematically shows the optical configuration of an optical pickup according to an embodiment of the present invention. Referring to the FIG. 1, the optical pickup is compatible with optical discs 1a, 1b, and 1c (collectively referred to as an optical disc 1) having corresponding different thicknesses. The compatible optical pickup includes an optical unit 10, which emits light beams having corresponding wavelengths suitable for the respective optical discs 1a, 1b, and 1c toward the optical disc 1. The optical unit 10 receives the emitted one of light beams traveling back after being reflected by the optical disc 1 to detect an information reproduction signal and/or an error signal. An objective lens 3 focuses the incident light beam to form a light spot on a recording surface of the optical disc 1. An actuator 5 makes the objective lens 3 tilt in a radial direction of the optical disc 1.

In the shown embodiment of the present invention, the optical unit 10 includes first through third optical units 20, 30, and 40. The optical units 20, 30, 40 emit corresponding first through third light beams 21a, 31a, and 41a having wavelengths suitable for the first through third optical discs 1a, 1b, and 1c. The optical units 20, 30, 40 further receive the corresponding first through third light beams 21a, 31a, and 41a traveling back after being reflected by the optical disc 1. The optical units 20, 30, 40 detect an information reproduction signal and/or an error signal from the reflected light beams. A first optical path changer 53 is arranged between the first and second optical units 20 and 30 and the objective lens 3. A second optical path changer 55 is arranged between the first optical path changer 53 and the objective lens 3. A first collimating lens 51 is arranged between the first optical unit 20 and the first optical path changer 53. A second collimating lens 57 is arranged between the second optical unit 30 and the first optical path changer 53.

An example of the first optical unit 20 is shown in FIG. 1 and includes a blue-violet light source 21 which emits the first light beam 21a having a blue-violet wavelength (for example, a 405 nm wavelength) that is suitable for the first optical disc 1a. An example of the first optical disc 1a is a next generation DVD family optical disc (hereinafter, referred to as the next generation DVD). Such a next generation DVD has a higher density than that of a DVD. A polarizing beam splitter 23 transmits or reflects the incident first light beam 21a according to the polarization thereof. A quarter wave plate 25 changes the polarization of the wavelength of the first light beam 21a. A photodetector 29 detects an information reproduction signal and/or an error signal by receiving the first light beam 21a after being reflected by the first optical disc 1a. A sensing lens 27 is arranged between the polarizing beam splitter 23 and the photodetector 29.

According to an aspect of the invention, the sensing lens 27 includes an astigmatism lens that is used to detect a focus error signal in an astigmatic method by generating an astigmatism in the first light beam 21a.

According to an example of the second optical unit 30, a hologram optical module for a red wavelength (for example, a 650 nm wavelength) is used to detect suitable for the second optical disc 1b. An example of the second optical disc 1b is a DVD family optical disc (hereinafter, referred to as the DVD). According to an example of the third optical unit 40, another hologram optical module for a near infrared wavelength (for example, a 780 nm wavelength) is used so as to be suitable for the third optical disc 1c. An example of the third optical disc 1c is a CD family optical disc (hereinafter, referred to as the CD).

While not shown, it is understood that the hologram optical module generally includes a light source for emitting a light beam having a predetermined wavelength (for example, a 650 nm or 780 nm wavelength). A photodetector is arranged at the side of the light source and receives the light beam traveling back after being reflected by the optical disc 1 to detect an information reproduction and/or error signal. A hologram element transmits most of the incident light beam output from the light source straight and diffracts the light beam traveling back after being reflected by the optical disc 1 into the $+1^{st}$ order or $-1^{st}$ order light beam to proceed toward the photodetector arranged to the side of the light source.

While not required, the hologram optical module may further include a grating to detect a tracking error signal using, for example, a DPP (differential push-pull) method. When the grating is included, the photodetector of the hologram optical module has a structure so that it can detect a tracking error signal in the DPP method. Here, detailed descriptions and illustrations of the hologram optical module for a red wavelength for a DVD and the hologram optical module for a near infrared wavelength for a CD respectively adopted as the second and third optical units 30 and 40 will be omitted.

While not required, the second and/or third optical units 30 and 40 may instead have the optical structure in which the light source and the photodetector are separately provided as in the first optical unit 20. Also, it is understood that a hologram optical module for a blue-violet wavelength (for example, a 405 nm wavelength) for the next generation DVD may be provided as the first optical unit 20. Moreover, it is understood that other types of structures can be used to achieve the optical structure of the optical unit 10.

Figure 11:
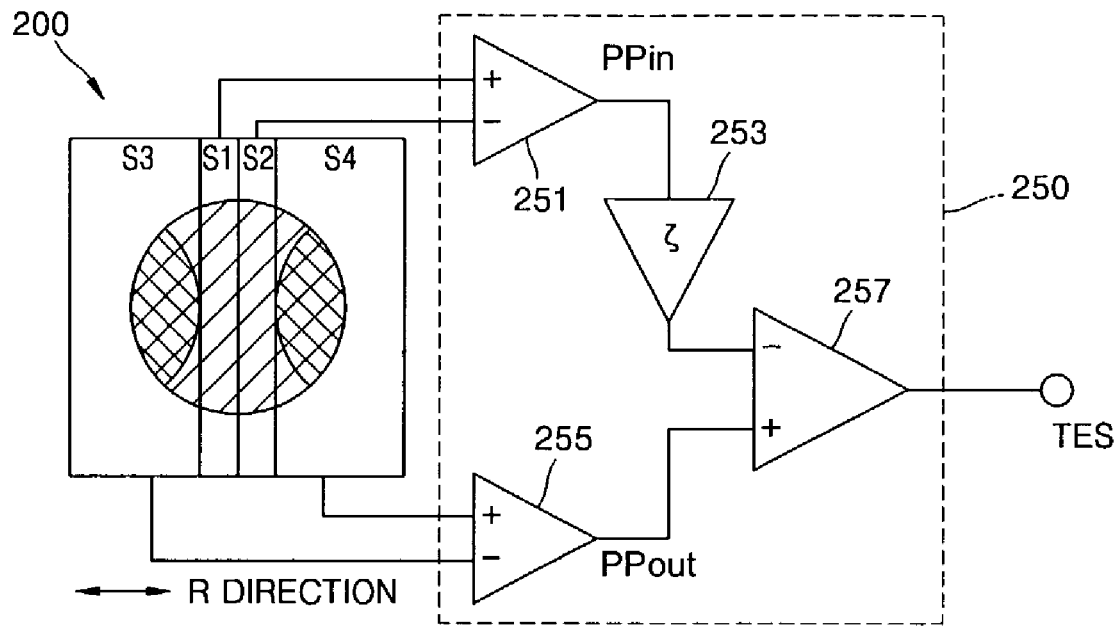
FIG. 11 schematically shows an embodiment of a photodetector and a tracking error signal detection circuit which can be applied to the compatible optical pickup according to the present invention.
Figure 12:
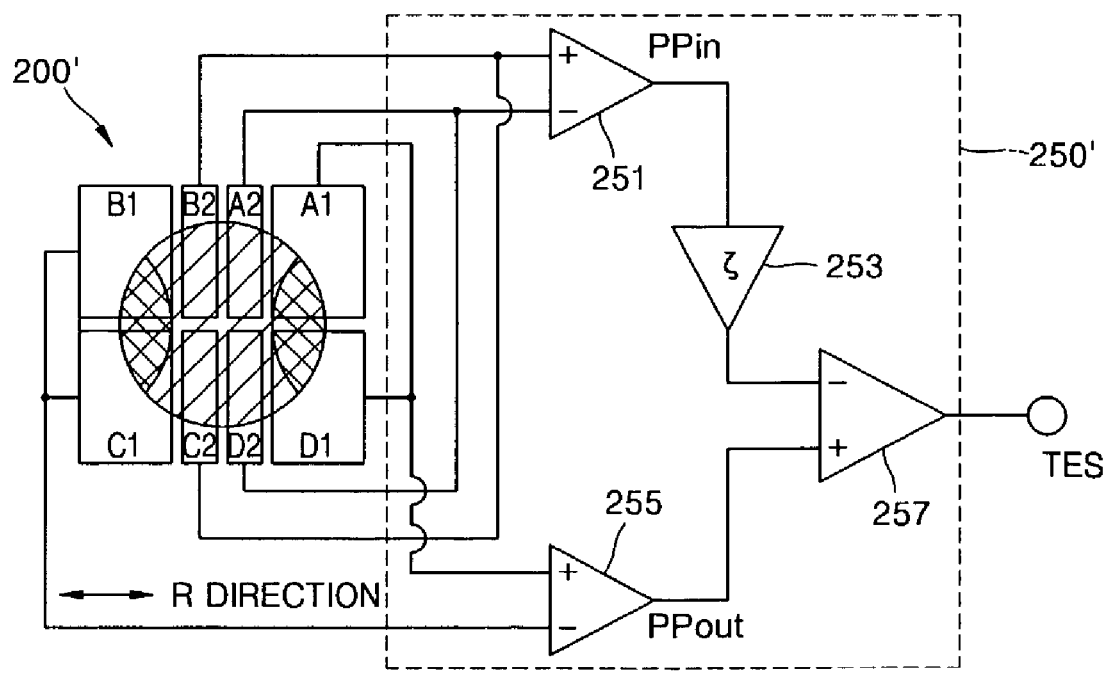
FIG. 12 schematically shows another embodiment of the photodetector and the tracking error signal detection circuit which can be applied to the compatible optical pickup according to the present invention.

According to an aspect of the invention, the objective lens 3 is optimized to an optical disc having the highest density. For the above embodiment, the optical disc 1 having the highest density is the first optical disc 1a, among the first through third optical discs 1a, 1b, and 1c. When the objective lens 3 is optimized to the first optical disc 1a, the embodiments of the second and third optical units 30 and 40 include corresponding photodetectors 200 having at least a four-section structure in a direction (a direction R) corresponding to the radial direction of the optical disc 1, as shown in the aspects of the invention of FIGS. 11 and 12, which will be described later. The photodetector 200 detects a tracking error signal in which a tracking error offset is minimized. Similarly, according to an aspect of the invention, the photodetector 200 of the first optical unit 20 preferably has at least a four-section structure in the direction R, as shown in FIGS. 11 and 12. However, other types of photodetectors can be used consistent with the invention.

The first optical path changer 53 is arranged between the first and second optical units 20 and 30 and the objective lens 3. The first optical path changer 53 makes the first and second light beams 21a and 31a output from the first and second optical units 20 and 30 proceed toward the objective lens 3. The first optical path changer 53 makes the first and second light beams 21a and 31a traveling back after being reflected by the optical disc 1 proceed toward the first and second optical units 20 and 30. According to an aspect of the invention, the first optical path changer 53 comprises a beam splitter 54 having a mirror surface 54a at which the first light beam 21a is transmitted while the second light beam 31a is totally reflected.

The second optical path changer 55 is arranged between the first optical path changer 53 and the objective lens 3. The second optical path changer 55 transmits the first and second light beams 21a and 31a output from the first and second optical units 20 and 30, and reflects the third light beam 41a output from the third optical unit 40. According to an aspect of the invention, the second optical path changer 55 includes a beam splitter 56 having a mirror surface 56a at which all or part of the first and second light beams 21a 31a are transmitted while all or part of the third light beam 41a is reflected. However, it is understood that other mechanisms are available to selectively alter optical paths and are useable for the optical path changers 53 and 54.

The first collimating lens 51 is arranged between the first optical unit 20 and the first optical path changer 53. The first collimating lens 51 changes the first light beam 21a output from the first optical unit 20 in the form of a divergent beam into a parallel beam to be incident on the objective lens 3. When the first collimating lens 51 is provided, the objective lens 3 is designed to be optimized to the first light beam 21a that is a parallel beam. Further, when the first collimating lens 51 is provided, the first light beam 21a is incident on the objective lens 3 in the form of a parallel beam, and the objective lens 3 is designed to be optimized to the first light beam 21a and the first optical disc 1a, superior reproduction and tracking error signals can be detected during the shifting of the objective lens 3 in the radial direction.

The second collimating lens 57 is arranged between the second optical unit 30 and the first optical path changer 53.

The shown second collimating lens 57 is provided to change the second light beam 31a output from the second optical unit 30 in the form of a divergent beam to a divergent beam that is close to a parallel beam. When the position of the light source of the second optical unit 30 is disposed at a position deviated from the focal point of the second collimating lens 57 (i.e., at the position shorter than a focal length), the second light beam 31a still diverges after passing through the second collimating lens 57 so that the second light beam 31a can be changed to the divergent beam that is close to a parallel beam. Since the second light beam 31a is divergent while almost being parallel when incident on the objective lens 3, when the second optical disc 1b is used, there is a restriction on the generated spherical aberration due to the difference in thickness between the first optical disc 1a and the second optical disc 1b and the difference in wavelength between the second light beam 31a and the first light beam 21a.

Also, as shown in FIG. 1, since the third light beam 41a output from the third optical unit 40 is incident on the objective lens 3 in the form of a divergent beam, the light source of the third optical unit 40 and the objective lens 3 constitute a finite optical system. Thus, when the third optical disc 1c is used, not only is there a restriction on the generated spherical aberration due to the difference in thickness between the first optical disc 1a and the third optical disc 1c and the difference in wavelength between the third light beam 41a and the first light beam 21a, but it is also possible to secure a sufficient working distance so that the third optical disc 1c and the objective lens 3 do not collide with each other.

Although FIG. 1 shows the second collimating lens 37, it is possible to correct the spherical aberration even when the objective lens 3 and the second optical unit 30 only constitute a finite optical system without the second collimating lens 57. Also, a collimating lens (not shown) for changing the third light beam 41a to a divergent beam close to a parallel beam may be further provided between the third optical unit 40 and the second optical path changer 55.

Here, although FIG. 1 shows the optical configuration of the optical unit 10 of the compatible optical pickup according to an embodiment of the present invention, the optical unit 10 of the compatible optical pickup according to the present invention is not limited to the optical configuration of FIG. 1. That is, the optical configuration of the optical unit 10 according to the present invention can be modified in a variety of ways within a range of the technical concept of the present invention.

In addition, as described above, the objective lens 3 is optimized to the first optical disc 1a that is the highest density optical disc. To be compatibly used with the second and third optical discs 1b and 1c, the objective lens 3 is provided between the second and third optical discs 1b and 1c and the objective lens 3 with a sufficient working distance so that the second and third optical discs 1b and 1c and the objective lens 3 do not collide with each other when the second and third light beams 31a and 41a are incident in the form of divergent beams and are focused to form light spots on the recording surfaces of the second and third optical discs 1b and 1c, respectively.

For example, when the first optical disc 1a has a thickness of 0.1 mm and is provided to achieve a desired recording capacity with respect to a blue-violet light beam having a 405 nm wavelength and an NA of 0.85 or more, the objective lens 3 preferably has an NA of 0.85 or more to a thickness of 0.1 mm and a 405 nm wavelength. Of course, when the first collimating lens 51 is provided and the first light beam 21a in the form of a parallel beam is incident on the objective lens 3, the objective lens 3 is designed to the first light beam 21a in the form of a parallel beam.

When the objective lens 3 is optimized to the first optical disc 1a and has a sufficient working distance when the second and third optical discs 1b and 1c are used, if the second and third light beams 31a and 41a are incident on the objective lens 3 in the form of a parallel beam, a spherical aberration may be generated due to the difference in thickness as compared with the first optical disc 1a in the second and third light beams 31a and 41a formed as light spots on the recording surfaces of the second and third light beams 31a and 41a by being focused by the objective lens 3. However, in the compatibly optical pickup shown in FIG. 1, since the second and third light beams 31a and 41a output from the second and third optical units 30 and 40 are incident on the objective lens 3 in the form of divergent beams, the generated spherical aberration due to the difference in thickness between the second and third optical discs 1b and 1c and the first optical disc 1a can be sufficiently restricted.

Table 1 shows a detailed design example of the objective lens 3 that can be compatibly used with the first through third optical discs 1a, 1b, and 1c having different thicknesses and can be adopted in the compatible optical pickup according to the present invention. Table 1 shows design data of an example of the objective lens 3 designed to the first light beam 21a input in the form of a parallel beam and the second and third light beams 31a and 41a input in the form of divergent beams, when the wavelengths of the first through third light beams 21a, 31a, and 41a are 405 nm, 650 nm, and 780 nm, respectively, the thicknesses of the first through third optical discs 1a, 1b, and 1c are 0.1 mm, 0.6 mm, and 1.2 mm, respectively, and the effective NA to the first through third light beams 21a, 31a, and 41a are 0.85, 0.60, and 0.45, respectively.

TABLE 1

| Surface | Radius of Curvature (mm) | Thickness/Interval (mm) | Material (Glass) |
|---|---|---|---|
| Object Surface | INFINITY | INFINITY<br>32.31958<br>20.99335 | |
| S1(STOP) | INFINITY | 0.000000 | |
| S2 (Aspheric Surface 1) | 1.562481<br>K: −0.830781<br>A: 0.115242E−01 B: 0.174402E−02 C: 0.432473E−04<br>D: 0.207460E−03 E: −.512981E−04 F: 0.100915E−04<br>G: 0.000000E+00 H: 0.000000E+00 J: 0.000000E+00 | 2.00000 | BaCD5_HOYA |
| S3 (Aspheric Surface 2 | −8.323786<br>K: −135.523964<br>A: 0.241679E−01 B: −.488517E−02 C: 0.442140E−03<br>D: −.129910E−04 E: 0.000000E+00 F: 0.000000E+00<br>G: 0.000000E+00 H: 0.000000E+00 J: 0.000000E+00 | 0.000000 | |
| S4 | INFINITY | 1.15590<br>1.09329<br>0.84607 | |
| S5 | INFINITY | 0.100000<br>0.60000<br>1.20000 | CG |
| Image Surface | INFINITY | 0.000000 | |

In Table 1, three values in each section of Thickness/Interval corresponding to the Object Surface, S4 and S5 indicate, in order, intervals between the Object Surface, S4, and S5 and the next surface or thicknesses thereof with respect to the first through third optical discs 1a, 1b, and 1c, respectively. BaCD5_HOYA is an optical medium forming the objective lens 3 and has refractive indices of 1.605256, 1.586422, and 1.582509 with respect to the wavelengths of 405 nm, 650 nm, and 780 nm, respectively. Also, cover glass (CG) is an optical medium from light incident surfaces of the first through third optical discs 1a, 1b, and 1c to the recording surface and has refractive indices of 1.621462, 1.581922, and 1.575091 with respect to the wavelengths of 405 nm, 650 nm, and 780 nm, respectively. K denotes a conic constant of the aspheric surfaces 1 and 2 S2 and S3 that are lens surfaces of the objective lens 3. A, B, C, D, E, F, G, H, and J are aspheric coefficients. S1-S5 indicating surfaces in Table 1 are shown in FIGS. 2A through 4a for reference.

The formula of an aspheric surface to the first and second aspheric surfaces S2 and S3 can be expressed as in Mathematical Formula 3 below when the depth from the apex of the aspheric surface is z.

$$z = \frac{ch^2}{1+\sqrt{1-(1+K)c^2h^2}} + Ah^4 + Bh^6 + Ch^8 + Dh^{10} + Eh^{12} + Fh^{14} + Gh^{16} + Hh^{18} + Jh^{20}$$

Mathematical Formula 3

Here, h denotes a height from an optical axis, c denotes a curvature, K denotes a conic coefficient, and A-J denote aspheric coefficients.

The objective lens 3 having the design data of Table 1 has sufficient working distances of 1.15590 mm, 1.09329 mm, and 0.84607 mm with respect to the first through third optical discs 1a, 1b, and 1c having thicknesses of 0.1 mm, 0.6 mm, and 1.2 m, respectively. Thus, the objective lens 3 does not collide with the optical disc 1 when the second and third optical discs 1b and 1c having thicknesses deviated from the optimal design conditions of the objective lens 3 (i.e., a DVD and a CD) are used. Also, the objective lens 3 having the design data of Table 1 is designed for an incident light beam in the form of a divergent beam with respect to a light beam having a wavelength deviated from the optimal design conditions. Additionally, since the second and third light beams 31a and 41a are incident on the objective lens 3 in the form of a divergent beam in the compatible optical pickup according to an embodiment of the present invention, the objective lens 3 has a sufficiently low optical path difference (OPD) with respect to the second and third optical discs 1b and 1c.

Figure 2A:
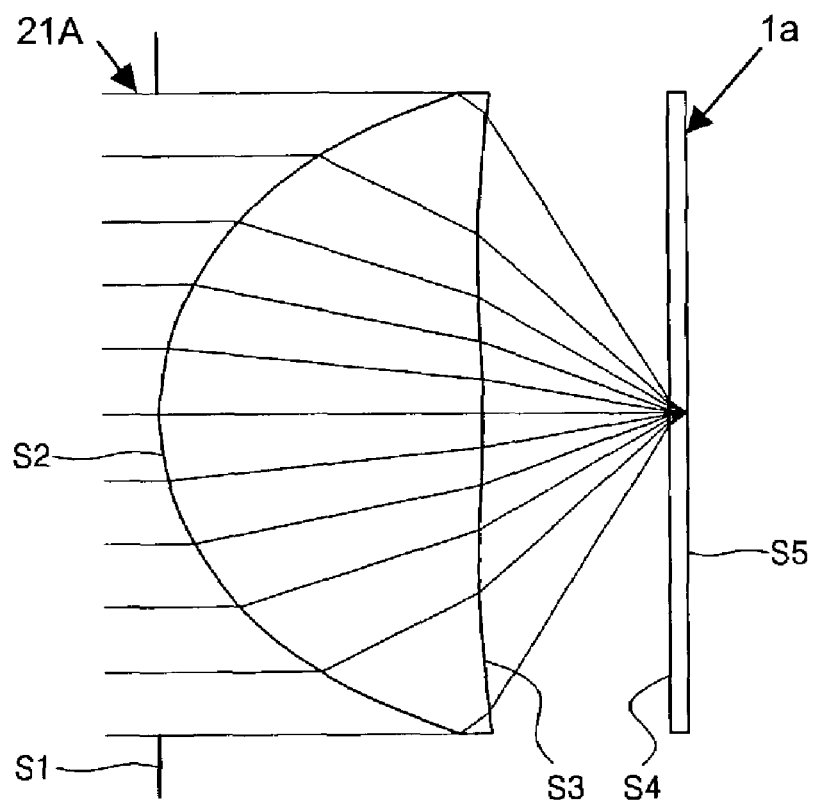
FIGS. 2A and 2B respectively show the optical path and the aberration of the first light beam when the first light beam is focused by an example of the objective lens formed according to the design data of Table 1.
Figure 2B:
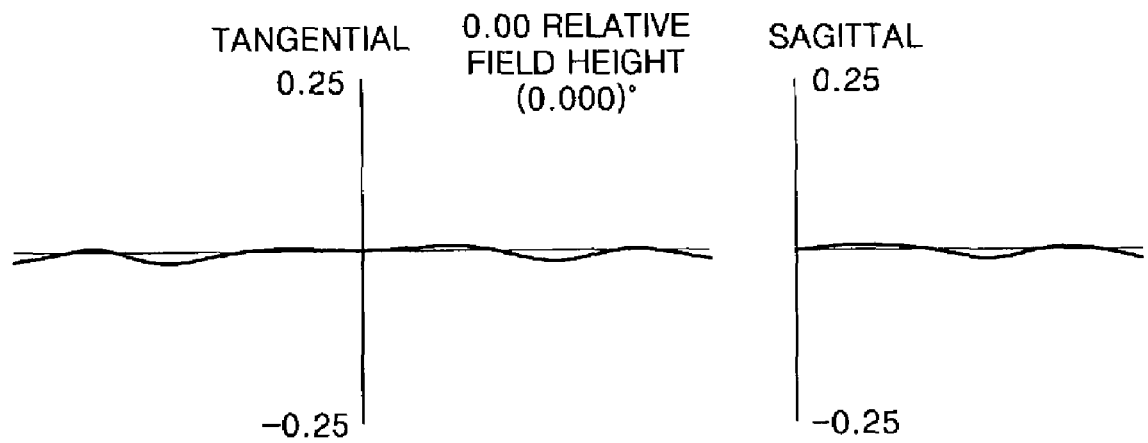
Figure 3A:
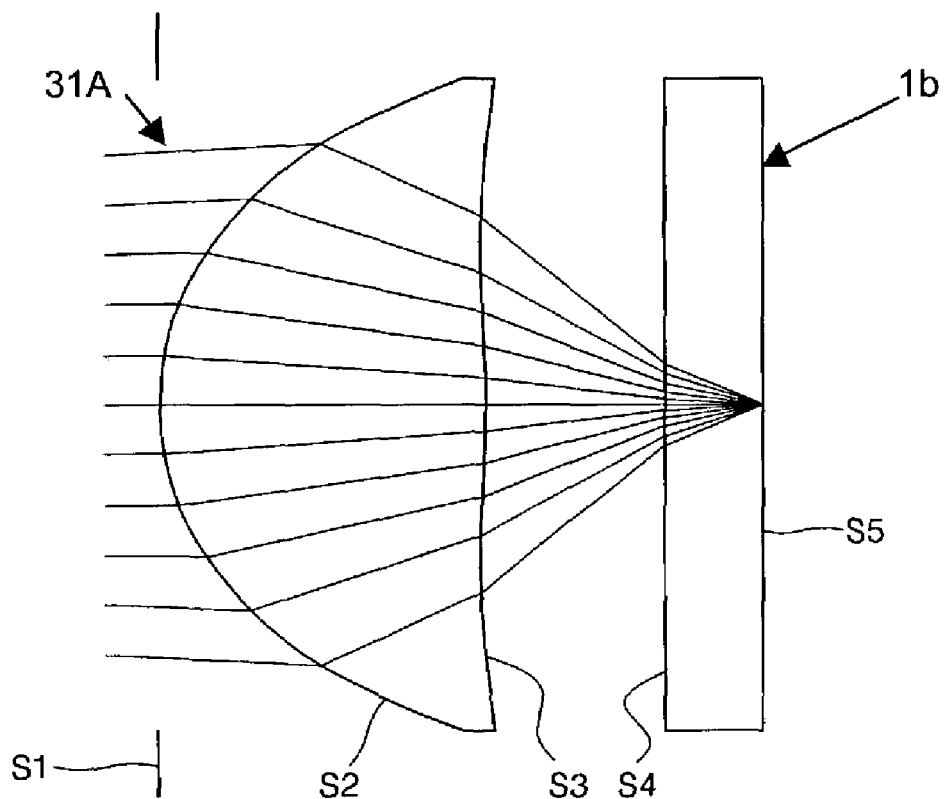
FIGS. 3A and 3B respectively show the optical path and the aberration of the second light beam when the second light beam is focused by the example of the objective lens formed according to the design data of Table 1.
Figure 3B:
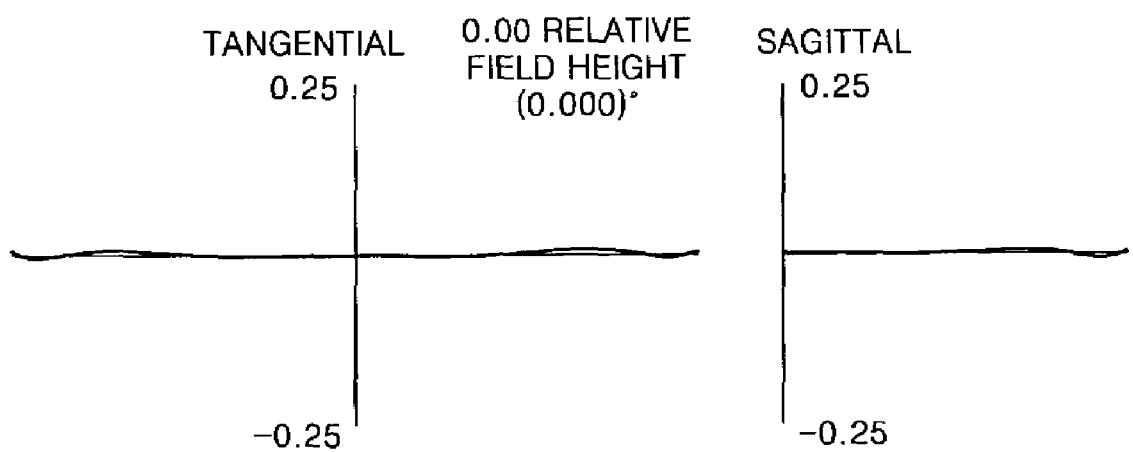
Figure 4A:
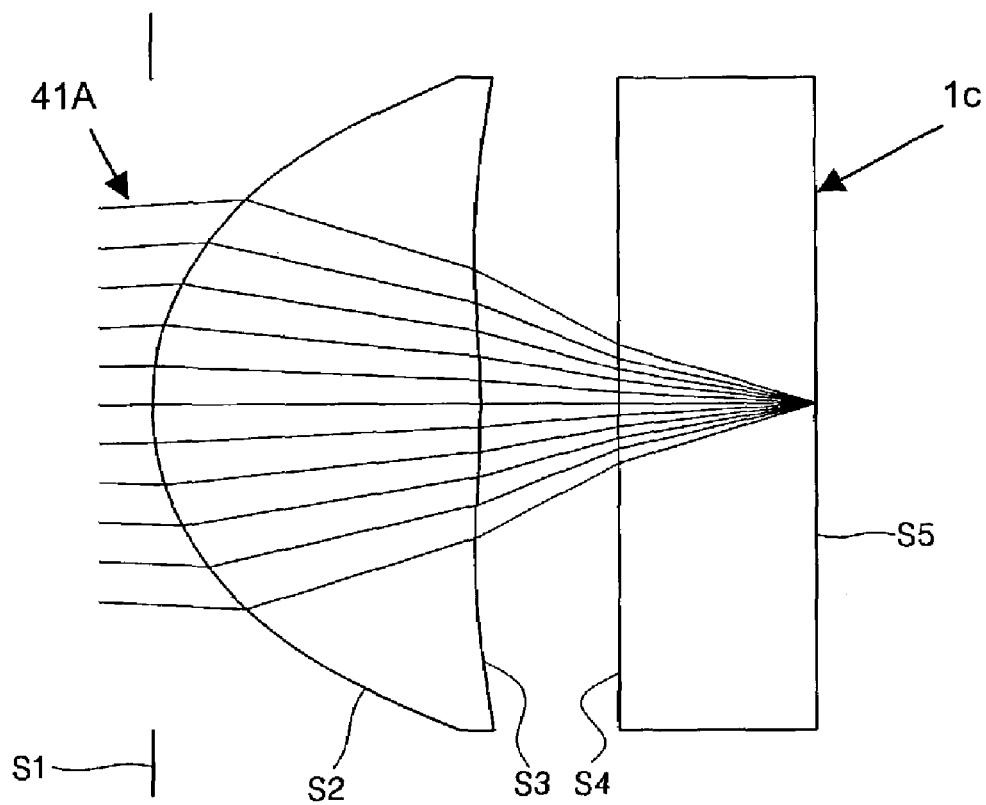
FIGS. 4A and 4B respectively show the optical path and the aberration of the third light beam when the third light beam is focused by the example of the objective lens formed according to the design data of Table 1.
Figure 4B:
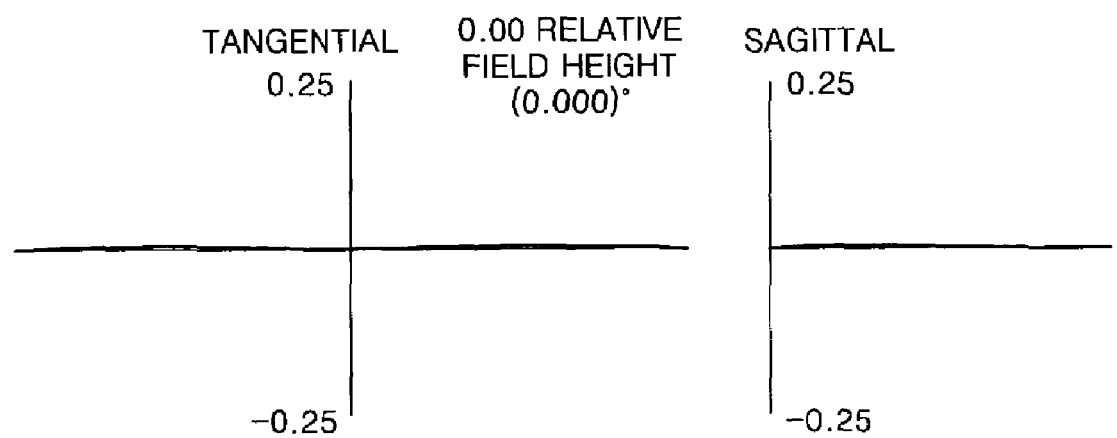

FIGS. 2A and 2B show the optical path and aberration of the first light beam 21a when a light spot is formed on the recording surface of the first optical disc 1a by focusing the first light beam 21a using the objective lens 3 formed according to the design data of Table 1, respectively. FIGS. 3A and 3B show the optical path and aberration of the second light beam 31a when a light spot is formed on the recording surface of the second optical disc 1b by focusing the second light beam 31a using the objective lens 3 formed according to the design data of Table 1, respectively. FIGS. 4A and 4B show the optical path and aberration of the third light beam 41a when a light spot is formed on the recording surface of the third optical disc 1c by focusing the third light beam 41a using the objective lens 3 formed according to the design data of Table 1, respectively. Here, FIGS. 2B, 3B, and 4B show the OPDs with respect to the first light beam 21a having the 405 nm wavelength, the second light beam 31a having the 650 nm wavelength, and the third light beam 41a having the 780 nm wavelength, respectively.

As can be seen from FIGS. 2A through 4B, the objective lens 3 has a sufficiently low OPD when focusing the first through third light beams 21a, 31a, and 41a and forming a light spot on the recording surface of the first through third optical discs 1a, 1b, and 1c. Thus, the compatible optical pickup according to using the objective lens 3 formed according to the design data of Table 1 can compatibly use the first through third optical discs 1a, 1b, and 1c.

Figure 5:
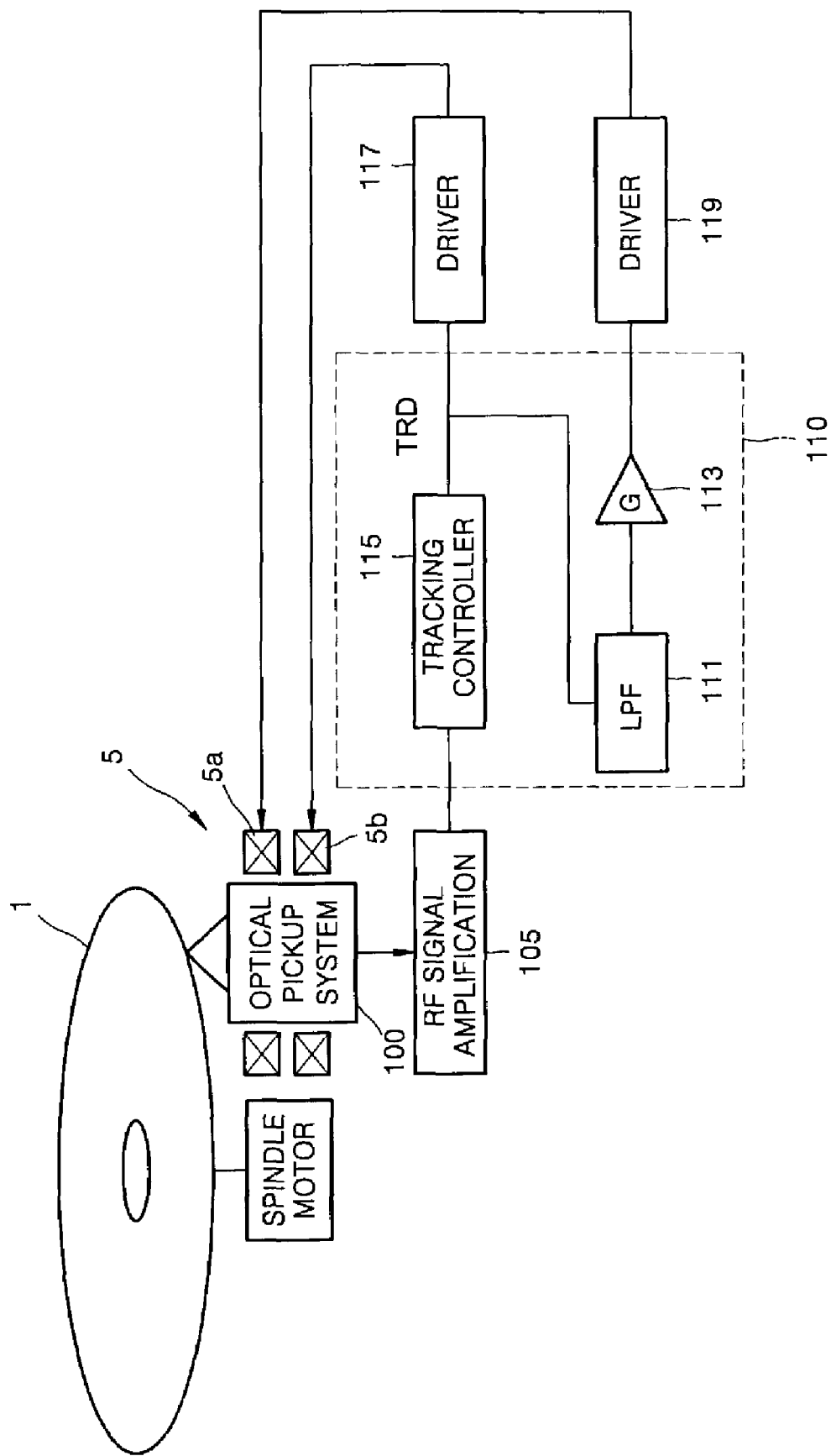
FIG. 5 schematically shows an embodiment of an optical disc system using the compatible optical pickup according to the present invention.

According to an aspect of the invention, the objective lens 3 is mounted on the actuator 5 as shown in FIGS. 1 and 5. The actuator 5 is capable of tilting the objective lens 3 about an axis substantially parallel to a radial direction of the optical disc 1. While not required in all aspects, the actuator 5 can move the objective lens 3 in a focus direction and a tracking direction as well as adjust the objective lens 3 in a radial tilt direction. The actuator 5 is capable of adjusting the objective lens 3 in the focus direction, tracking direction, and radial tilt direction according to known technology in the field to which the present invention pertains and detailed descriptions of the structure and operation of the actuator 5 will therefore be omitted.

When the actuator 5 applies a radial tilt to the objective lens 3, the amount of inclination applied by the actuator 5 (i.e., the amount of inclination of the objective lens 3) is proportional to the translational motion of the objective lens 3 in the radial direction of the optical disc 1. Also, the amount of inclination of the objective lens 3 can be detected from the current applied to a coil of a tracking actuator portion 5b of the actuator 5 shown in FIG. 5 to make the objective lens 3 perform a translational motion in the radial direction.

That is, an optical disc system using the compatible optical pickup according to an aspect of the present invention shown in FIG. 5 controls the movement of the objective lens 3 as follows. As can be seen from FIG. 5, the actuator 5 includes a tilt actuator portion 5a to control the radial tilt and the tracking actuator portion 5b to control the tracking. Of course, while not required in all aspects, the actuator 5 preferably includes a focus actuator portion (not shown) for the control of focusing. Here, it is understood that other actuators having a variety of structures capable of applying radial tilt to the objective lens 3 are known in the present technical field and can be used as the actuator 5 in the compatible optical pickup according to other aspects of the present invention.

Referring to FIG. 5, a tracking error signal TES is detected by using a compatible optical pickup optical system 100 according to an embodiment of the present invention. A tracking driving signal TRD is obtained by calculating the TES and the tracking actuator portion 5b and the tilt actuator portion 5a are driven by using the tracking driving signal TRD. In FIG. 5, the optical pickup optical system 100 includes a servo circuit 110, a low pass filter 111, and a gain adjuster 113. The optical pickup optical system 100 also includes an RF signal amplifier 105 to amplify a signal output from the photodetectors of the optical units 20, 30, and 40 of the compatible optical pickup optical system 100 according to the present invention. The optical pickup optical system 100 further includes a tracking controller 115 and drivers 117, 119 to drive the tracking actuator portion 5b and the tilt actuator portion 5a, respectively. The signal processing circuit structure and signal processing process of FIG. 5 are known in the present technical field and can also be analogized, such that detailed descriptions thereof will be omitted.

As can be seen from FIG. 5, since a tracking driving signal TRD is used for driving both the tracking actuator portion 5b and the tilt actuator portion 5a, the amount of inclination of the objective lens 3 is proportional to a translational motion of the objective lens 3 in the radial direction of the optical disc 1. The amount of tilt of the objective lens 3 can be detected from the current applied to a coil of the tracking actuator portion 5b to make the objective lens 3 perform a translational motion in the radial direction of the optical disc 1.

Referring back to FIG. 1, since the objective lens 3 is provided to be suitable for the high density first optical disc 1a needing the greatest NA, an aspect of the compatible optical pickup further includes a NA adjusting member 7. The NA adjusting member 7 adjusts an effective NA with respect to the light beam having a wavelength deviated from the optimal design conditions of the objective lens 3 for a relatively the low density second and third optical discs 1b, 1c. The NA adjusting member 7 includes a central transmission area to transmit an incident light beam for the high density optical disc 1a and the low density optical discs 1b, 1c and having a diameter corresponding to an effective NA suitable for at least one of the low density optical discs 1b, 1c. The NA adjusting member 7 also includes and an NA adjustment area that is disposed outside the central transmission area and blocks a light beam for one of the low density optical discs 1b, 1c that is an NA limit object.

For example, as shown in FIG. 1, when the compatible optical pickup according to the present invention compatibly uses the first through third optical discs 1a, 1b, and 1c and the objective lens 3 is provided to be suitable for the first optical disc 1a, the NA adjusting member 7 has a structure to adjust NA of the second and third light beams 31a and 41a so that the second and third light beams 31a and 41a focused by the objective lens 3 have effective NAs suitable for the second and third optical discs 1b and 1c. As a detailed example, the NA adjusting member 7 includes a first central transmission area 8a having a diameter corresponding to an effective NA suitable for the second optical disc 1b to make the effective NA of the second light beam 31a to be 0.6. A second central transmission area 9a has a diameter corresponding to an effective NA suitable for the third optical disc 1c to make the effective NA of the third light beam 41a to be 0.45.

A first NA adjustment area 8b is around the first central transmission area 8a. The first NA adjustment area 8b comprises a hologram and/or a wavelength selective filter to block the second light beam 31a that has an NA limit object for use with optical disc 1b, and to transmit the first light beam 21a. Also, a second NA adjustment area 9b is around the second central transmission area 9a. The second NA adjustment area 9b comprises a hologram and/or a wavelength selective filter to block the third light beam 41a that has an NA limit object for use with the third optical disc 1c, and to transmit the first and second light beams 21a and 31a.

Here, since it is preferable to match the centers of the first and second central transmission areas 8a and 9a with the center of the objective lens 3, the NA adjusting member 7 is preferably mounted on the actuator 5 together with the objective lens 3. However, it is understood that other mounting techniques and alignments are possible.

Although in FIG. 1 the NA adjusting member 7 is provided as a separate member from the objective lens 3, it is understood that the NA member 7 can be integrally formed with the objective lens 3. For example, the first central transmission area 8a and the first NA adjustment area 8b of the NA adjusting member 7 can be formed on one lens surface facing the optical unit 10 of the objective lens 3, whereas the second central transmission area 9a and the second NA adjustment area 9b of the NA adjusting member 7 can be formed on the other lens surface of the objective lens 3. It is further understood that one of the area 8b, 9b can be on the member 7, while the other of the areas 8b, 9b can be on a lens surface of the objective lens 3.

Figure 6:
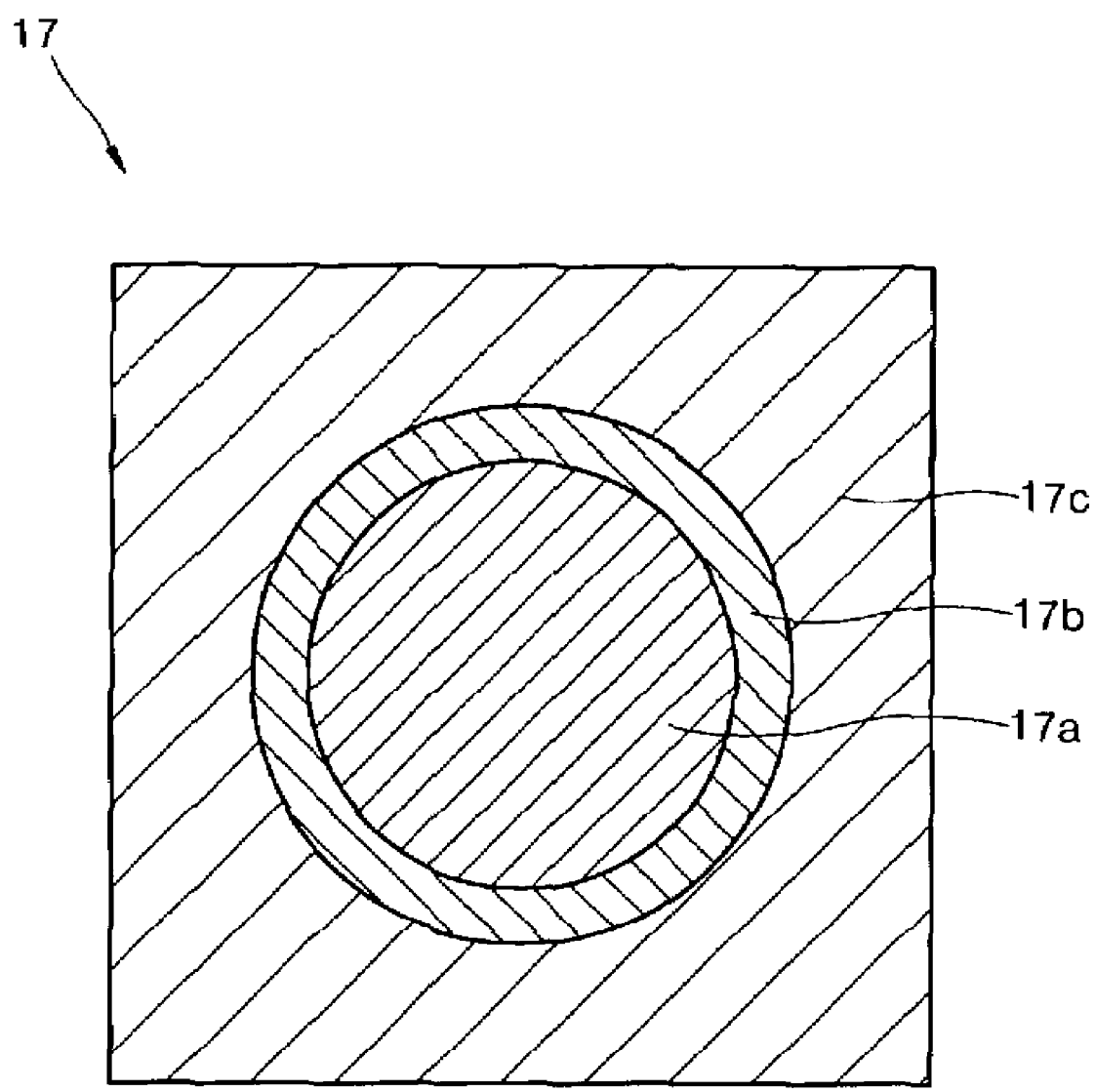
FIG. 6 schematically shows another embodiment of a numerical aperture adjusting member used in the compatible optical pickup according to the present invention.

The compatible optical pickup according to another aspect of the present invention may include an NA adjusting member 17 as shown in FIG. 6 instead of the NA adjusting member 7 shown in FIG. 1. The NA adjusting member 17 includes a first central transmission area 17a to transmit all the wavelengths of the first through third light beams 21a, 31a, and 41a, a first NA adjustment area 17b to transmit only the wavelengths of the first and second light beams 21a and 31a (light beams in blue-violet and red wavelength), and a second NA adjustment area 17c to transmit only the wavelength of the first light beam 21a (a light beam in a blue-violet wavelength). Here, the diameter of the first central transmission area 17a (the inner diameter of the first NA adjustment area 17b) has a size corresponding to an effective NA (for example, 0.45) suitable for the third optical disc 1c while the diameter of the first NA adjustment area 17b (the inner diameter of the second NA adjustment area 17c) preferably has a size corresponding to an effective NA (for example, 0.6) suitable for the second optical disc 1b.

The NA adjusting member 17 can be formed by coating one lens surface of the objective lens 3 or an additional transparent plate. Here, the coating is performed such that no phase difference is generated between the first central transmission area and the first and second NA adjustment areas 17a, 17b, and 17c. That is, the coating is performed such that the phase change would be identical when the first light beam 21a passes through each of the first central transmission area and the first and second NA adjustment areas 17a, 17b, and 17c, However, it is understood that the lens surface of the objective lens 3 can be otherwise prepared to selectively change the optical path of incident light, such as through use of holograms instead of or in addition to coatings.

In the compatible optical pickup according to an embodiment of the present invention of FIG. 1, when the first optical disc 1a having a thickness corresponding to the optimal design conditions of the objective lens 3 is used, superior reproduction and tracking error signals can be detected. Further, when the second and third optical discs 1b and 1c having thicknesses deviated from the optimal design conditions of the objective lens 3 are used, a sufficient working distance can be secured and, since the generation of spherical aberration and coma aberration are restricted, superior reproduction and tracking error signals can be detected.

When the first optical disc 1a is used, the light source 21 of the first optical unit 20 is operated to emit the first light beam 21a. When the objective lens 3 is designed to be optimal to the wavelength of the first light beam 21a and the thickness of the first optical disc 1a, the spherical aberration is hardly generated when a corresponding light spot is formed on the recording surface of the first optical disc 1a by focusing the first light beam 21a using the objective lens 3. Also, the coma aberration is hardly generated when the objective lens 3 is shifted in the radial direction of the first optical disc 1a. Thus, very superior tracking and reproduction signals can be detected.

When the second and third optical discs 1b and 1c are used, the light sources of the second and third optical units 30 and 40 are operated to individually emit the corresponding second and third light beams 31a and 41a. Since the second and third light beams 31a and 41a are incident on the objective lens 3 as corresponding divergent beams, it is possible to sufficiently correct the generated spherical aberrations due to the difference in thickness between the second and third optical discs 1b and 1c and the first optical disc 1a and the difference in wavelength between the second and third light beams 31a and 41a and the first light beam 21a. Also, as can be seen from the design example of the objective lens of Table 1, a sufficient working distance can be obtained. Additionally, as described below, according to the compatible optical pickup according to an embodiment of the present invention, when the second and third optical discs 1b and 1c that deviate from the optimal design conditions of the objective lens 3 are used, the generated coma aberration due to the shift of the objective lens 3 in the radial direction can be sufficiently restricted. Thus, when the second and this optical discs 1b and 1c are used, superior reproduction and tracking error signals can be detected.

Figure 7:
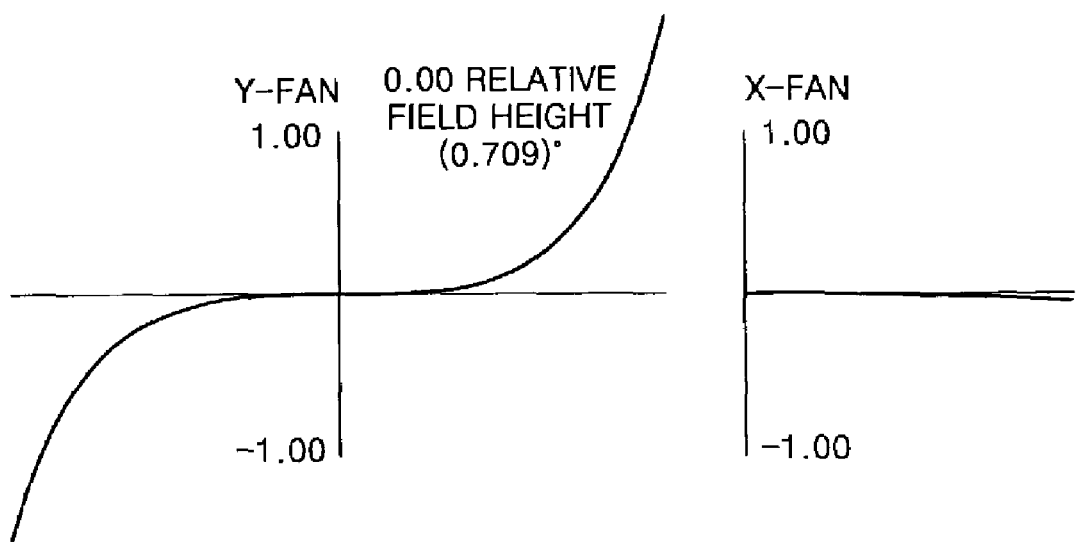
FIG. 7 shows an aberration generated when a second light beam having a 650 nm wavelength $\lambda 2$ is focused by an objective lens to form a light spot on the recording surface of a DVD when the objective lens is shifted by 0.4 mm during the reproduction of the DVD by using the compatible optical pickup according to an embodiment of the present invention.
Figure 8:
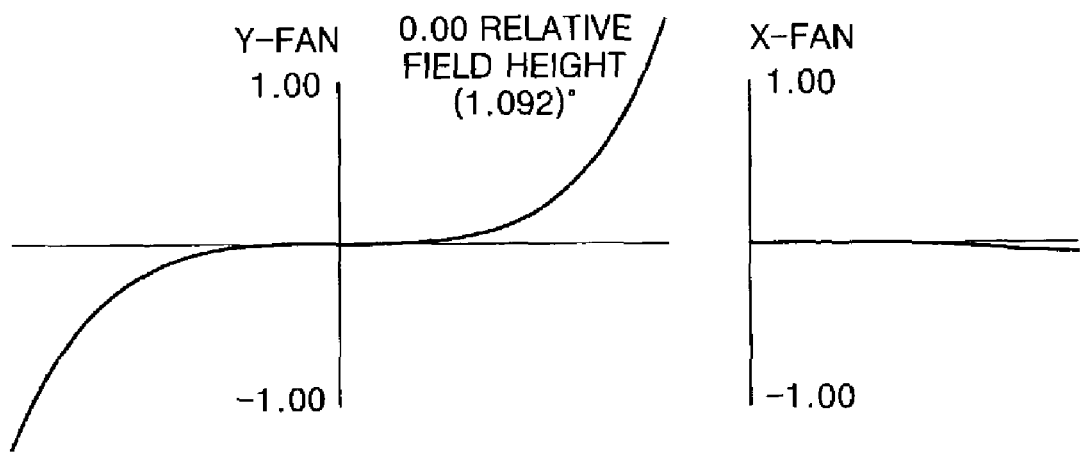
FIG. 8 shows an aberration generated when a third light beam having a 780 nm wavelength $\lambda 3$ is focused by an objective lens to form a light spot on the recording surface of a CD when the objective lens is shifted by 0.4 mm during the reproduction of the CD by using the compatible optical pickup according to an embodiment of the present invention.

Referring to FIGS. 7 through 10 and Table 2, in the compatible optical pickup according to an embodiment of the present invention, the detection of superior reproduction and tracking error signals will be described. The detection is due to a restriction of the generation of coma aberration due to the shift of the objective lens 3, in the radial direction when the second and third optical disc 1b, 1c, which deviate from the optimal design conditions of the objective lens 3 are reproduced. Since the second and third light beams 31a and 41a are incident on the objective lens 3 in the form of divergent light beams, a coma aberration is generated when the objective lens 3 is shifted in the radial direction as in the reproduction of the eccentric optical disk 1. FIGS. 7 and 8 show the aberration when a light spot is formed on the recording surface of a DVD (an example of the second optical disc 1b) and a CD (an example of the third optical disc 1c) by focusing the second light beam 31a having a 650 nm wavelength $\lambda 2$ and a third light beam 41a having a 780 nm wavelength $\lambda 3$ using the objective lens 3 when the objective lens 3 is shifted by 0.4 mm during the reproduction of the DVD and CD.

As can be seen from FIGS. 7 and 8, since the second and third light beams 31a and 41a are incident on the objective lens 3 in the form of divergent light beams, during the shift of the objective lens 3, an optical aberration, in particular, a coma aberration, is generated greatly. When the objective lens 3 is shifted by 0.4 mm in the radial direction, as shown in Table 2, optical aberration (OPDrms) is generated as much as 0.201 $\lambda 2$ with respect to the DVD and optical aberration (OPDrms) is generated as much as 0.167 $\lambda 3$ with respect to the CD.

TABLE 2

|  | Objective lens shift/Objective lens radial tilt | OPDrms |
| --- | --- | --- |
| DVD | 0.0 mm/0° | 0.005 $\lambda 2$ |
|  | 0.4 mm/0° | 0.201 $\lambda 2$ |
|  | 0.4 mm/1.2° | 0.011 $\lambda 2$ |
| CD | 0.0 mm/0° | 0.001 $\lambda 3$ |
|  | 0.4 mm/0° | 0.167 $\lambda 3$ |
|  | 0.4 mm/2.0° | 0.012 $\lambda 3$ |

Figure 9:
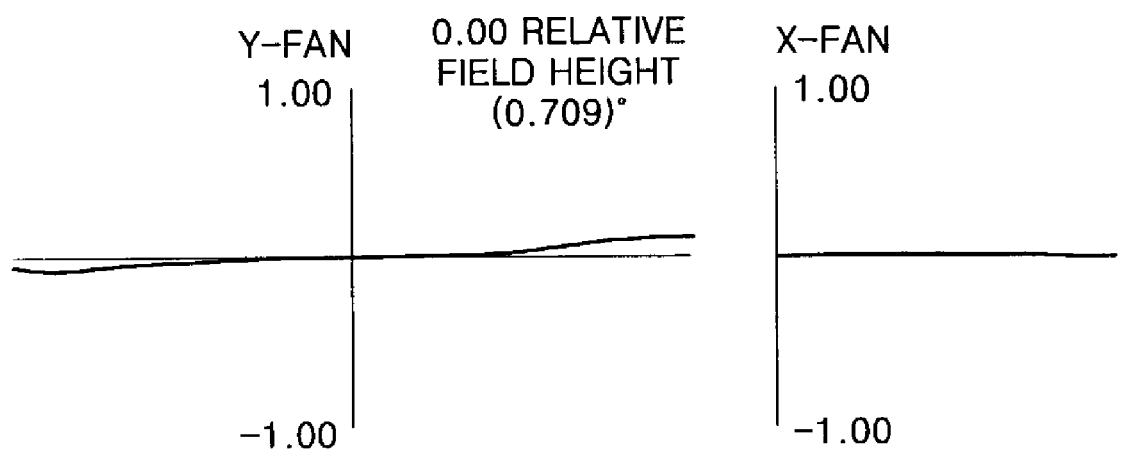
FIG. 9 shows an aberration generated when radial tilt is applied to an objective lens corresponding to the amount of shift of the objective lens during the shifting of the objective lens under the same conditions shown in FIG. 7.
Figure 10:
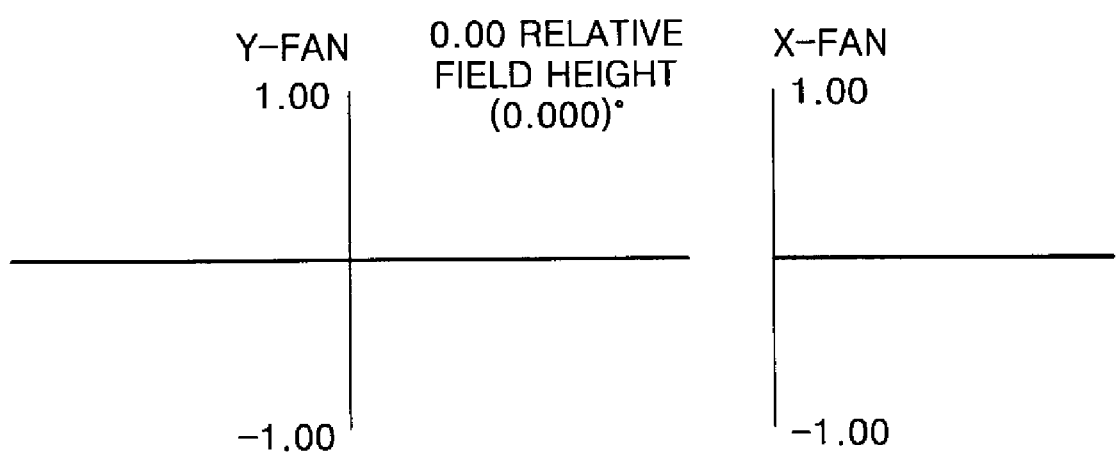
FIG. 10 shows an aberration generated when radial tilt is applied to an objective lens corresponding to the amount of shift of the objective lens during the shifting of the objective lens under the same conditions shown in FIG. 8.

However, when a radial tilt is applied to the objective lens 3 corresponding to the amount of the shift of the objective lens 3 during the shift of the objective lens 3, as can be seen from FIGS. 9 and 10, the generated optical aberration, in particular, the generated coma aberration, due to the shift of the objective lens 3 is much restricted so that optical aberration is hardly generated. This is confirmed by Table 2.

As shown in Table 2, when a radial tilt of 1.2° is applied to the objective lens 3 that is shifted by 0.4 mm with respect to the DVD, the optical aberration OPDrms is reduced to 0.011 $\lambda 2$. When a radial tilt of 2.0° is applied to the objective lens 3 that is shifted by 0.4 mm with respect to the CD, the optical aberration OPDrms is reduced to 0.012 $\lambda 3$. Thus, according to the compatible optical pickup according to an embodiment of the present invention, when the optical disc 1 having a thickness deviated from the optimal design conditions of the objective lens 3 is used, the generation of the coma aberration can be restricted during the shift of the objective lens 3 so that superior tracking error and reproduction signals can be detected.

The detection of a tracking error signal by which a tracking error signal offset due to the shift of the objective lens 3 in the radial direction can be removed when the optical disc 1 having a format deviated from the optimal design conditions of the objective lens 3 (for example, when the second and/or third optical discs 1b and 1c are used) will now be described below.

It is known in the field of the present technology that, although a push-pull method can be used for the detection of a tracking error signal with respect to a recordable optical disc 1, since a tracking error signal offset is generated by the shift of the objective lens 3 in the radial direction, a differential push pull (DPP) method is generally used to correct the tracking error signal offset. In the compatible optical pickup of FIG. 1, when a divergent beam is used for an optical disc 1 having a thickness deviated from the optimal design conditions of the objective lens 3, a tracking error signal detection technology as shown in FIGS. 11 and 12 is further preferably adopted.

Referring to FIG. 11, when the optical disc 1 having a format deviated from the optimal design conditions (i.e., the second and third optical discs 1b and 1c) is used, a photodetector 200 for detecting an information signal and/or error signal by receiving the light beam reflected by the recording surface of the optical disc 1 preferably has a structure having at least four sections divided in a direction corresponding to the radial direction of the optical disc 1. Here, the photodetector 200 may comprise photodetectors of the second and third optical units 30 and 40. When the first optical disc 1a is used, if a tracking error signal detection technology described with reference to FIG. 11 is applied, the photodetector 200 may be the photodetector 29 of the first optical unit 20.

Here, the embodiment of the photodetector 200 has a structure sectioned such that a baseball pattern portion of a light beam reflected and/or diffracted by the optical disc 1, generated due to a periodic structure in a track direction of the optical disc 1, is received only by outer section regions S3 and S4 of the photodetector 200. In the case of FIG. 11, the baseball pattern portion is a portion of the reflected light where the $0^{th}$ order diffractive light and the $+1^{st}$ order or $-1^{st}$ order diffractive light of the light reflected/diffracted by the optical disk 1 overlap. An example of the resulting baseball pattern portion is seen in FIG. 11.

A tracking error signal detection circuit 250 includes a first subtracter 251 is used to obtain a first subtraction signal between detection signals of inner section regions S1 and S2 of four section regions 51, 52, 53, 54 of the photodetector 200. A second subtracter 255 obtains a second subtraction signal between detection signals of the outer section regions S3 and S4. A gain adjuster 253 applies a predetermined gain $\zeta$ to the first subtraction signal. A third subtracter 257 obtains a third signal between the gain adjusted first subtraction signal output from the gain adjuster 253 and the second subtraction signal output from the second subtracter 255.

When the first subtraction signal is PPin and the second subtraction is PPout, the tracking error signal TES can be detected as in Mathematic Formula 4.

$$TES = PPout - \zeta \cdot PPin, \qquad \text{Mathematic Formula 4}$$

where $\zeta$ is the gain.

In the above description and illustration with reference to FIG. 11, the gain $\xi$ is applied to the first subtraction signal PPin. However, it is possible to apply another gain to the second subtraction subtracting signal PPout instead of or in addition to applying the gain $\xi$ to the first subtraction signal PPin.

Also, although the photodetector 200 is described and illustrated to be divided into four sections in a direction corresponding to the radial direction of the optical disc 1 in FIG. 11, according to another embodiment of the photodetector 200 shown in FIG. 12, the photodetector 200' has an eight-section structure by being divided into four sections in a direction corresponding to the radial direction of the optical disc 1 and into two sections in a direction corresponding to the tangential direction of the optical disc 1. The photodetector 200' may also have a sixteen-section structure (not shown). Here, as shown in FIG. 12, a tracking error signal detection circuit 250' has been modified considering the section structure of a photodetector 200', but is functionally the same as the tracking error signal detection circuit 250 shown in FIG. 11.

In the meantime, in the compatible optical pickup according to an embodiment of the present invention, a tracking error signal detection technology in the DPP method or the tracking error signal detection technology as shown in FIGS. 11 and 12 can be applied to the first optical disc 1a having the format satisfying the optimal design conditions of the objective lens 3.

In the above description, the compatible optical pickup according to the present invention is described and illustrated to include the three optical units for emitting light beams having different wavelengths to compatible adopt the next generation DVD, the DVD, and the CD.

According to the above-described present invention, a high density optical disc and a low density optical disc having different thicknesses can be compatibly used. Also, a superior aberration characteristic can be obtained without additional optical parts with respect to the low density optical disc when the objective lens is shifted in the radial direction of the optical disc.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A compatible optical pickup for use with a high density recording medium and at least one low density recording medium, the compatible optical pickup comprising:
   an objective lens having an optical property to form a light spot suitable for recording and/or reproduction on a recording surface of the high density recording medium by focusing a first incident light beam for the high density recording medium and obtaining a high NA suitable for the high density recording medium, and to form a light spot suitable for recording and/or reproduction on a recording surface of the low density recording medium by focusing a second incident light beam for the low density recording medium; and
   an actuator provided to apply tilt to the objective lens, wherein:
   the second light beam for the low density recording medium is incident on the objective lens in the form of a divergent beam,
   when the objective lens is shifted in a radial direction with respect to the low density recording medium, the actuator applies a tilt to the objective lens corresponding to the shift so as to correct a coma aberration due to the shift,
   an amount of the tilt applied to the objective lens is proportional to a translational movement of the objective lens in the radial direction, and
   the actuator comprises a coil which receives current, and the amount of tilt applied to the objective lens is detected from a tracking driving signal output from a tracking controller to make the objective lens perform the translational movement in the radial direction.

2. The compatible optical pickup as claimed in claim 1, wherein the tilt is a radial tilt about an axis parallel to the radial direction.

3. The compatible optical pickup as claimed in claim 1, wherein the tilt is a radial tilt about an axis parallel to the radial direction.

4. The compatible optical pickup as claimed in claim 1, wherein the objective lens has a numerical aperture (NA) of 0.85 or more with respect to a blue-violet light beam for use with the high density recording medium having a thickness of 0.1 mm.

5. The compatible optical pickup as claimed in claim 1, further comprising a numerical aperture (NA) adjusting member to adjust an NA with respect to the second light beam so as to provide an effective NA suitable for use with the low density recording medium.

6. The compatible optical pickup as claimed in claim 1, further comprising a photodetector to receive and detect the second light beam reflected by the low density recording medium, wherein the photodetector comprises at least four sections divided in the radial direction of the recording medium grouped as a pair of inner light receiving portions and a pair of outer light receiving portions.

7. The compatible optical pickup as claimed in claim 6, wherein the photodetector has a structure in which a baseball pattern portion of the second light beam reflected and/or diffracted by the low density recording medium due to a periodic structure of the low density recording medium in a track direction is received by the outer light receiving portions and is not received by the inner light receiving portions.

8. The compatible optical pickup as claimed in claim 7, further comprising:
   an inner subtractor which subtracts signals from the inner light receiving portions to produce a first subtraction signal, and
   an outer subtractor which subtracts signals from the outer light receiving portions to produce a second subtraction signal,
   wherein, when one of the first and second subtraction signals is PP1 and the other of the first and second subtraction signals is PP2, a tracking error signal TES is detected according to the following equation, $$TES = PP2 - \zeta \cdot PP1$$

wherein, $\zeta$ is a gain.

9. The compatible optical pickup as claimed in claim 6, further comprising:
- an inner subtractor which subtracts signals from the inner light receiving portions to produce a first subtraction signal, and
- an outer subtractor which subtracts signals from the outer light receiving portions to produce a second subtraction signal,
- wherein, when one of the first and second subtraction signals is PP1 and the other of the first and second subtraction signals is PP2, a tracking error signal TES is detected according to the following equation, $$TES = PP2 - \zeta \cdot PP1$$

wherein, $\zeta$ is a gain.

10. A recording and/or reproducing apparatus for use with recording media having different recording densities, comprising:
- an optical unit which generates a parallel first light beam having a first wavelength for use with a high density recording medium, detects a first signal from the first light beam reflected from the high density recording medium, generates a divergent second light beam having a second wavelength longer than the first wavelength for use with a low density recording medium, and detects a second signal from the second light beam reflected from the low density recording medium; and
- an optical pickup including an objective lens and an adjustment unit responsive to the first and second signals and which adjusts the objective lens about an axis to compensate for a coma aberration generated with respect to the low density recording medium, the objective lens having an optical property by which the parallel first light beam forms a light spot suitable for recording and/or reproduction with respect to the high density recording medium and the divergent second light beam forms a light spot suitable for recording and/or reproduction with respect to the low density recording medium wherein:
- the objective lens is tilted during the adjustment thereof, an amount of the tilt being proportional to a translational movement of the objective lens in the radial direction of the recording media, and
- the tilting is accomplished by an actuator comprising a coil which receives current with the amount of the tilt applied to the objective lens being detected from a tracking driving signal output from a tracking controller to make the objective lens perform the translational movement in the radial direction.

* * * * *

UNITED STATES PATENT AND TRADEMARK OFFICE
CERTIFICATE OF CORRECTION

| | |
|---|---|
| PATENT NO. | : 7,372,794 B2 |
| APPLICATION NO. | : 10/454838 |
| DATED | : May 13, 2008 |
| INVENTOR(S) | : Tae-kyung Kim et al. |

It is certified that error appears in the above-identified patent and that said Letters Patent is hereby corrected as shown below:

Title Page, Item (54), Title, change Title from "COMPATIBLE OPTICAL PICKUP APPLYING TILT TO OBJECTIVE LENS IN PROPORTION TO RADIAL MOVEMENT OF OBJECTIVE LENS" to --COMPATIBLE OPTICAL PICKUP--.

Signed and Sealed this

Nineteenth Day of August, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,372,794 B2 | Page 1 of 1 |
| APPLICATION NO. | : 10/454838 | |
| DATED | : May 13, 2008 | |
| INVENTOR(S) | : Tae-kyung Kim et al. | |

It is certified that error appears in the above-identified patent and that said Letters Patent is hereby corrected as shown below:

Title Page, Item (54), and Column 1, lines 1-4, Title, change Title from "COMPATIBLE OPTICAL PICKUP APPLYING TILT TO OBJECTIVE LENS IN PROPORTION TO RADIAL MOVEMENT OF OBJECTIVE LENS" to --COMPATIBLE OPTICAL PICKUP--.

This certificate supersedes the Certificate of Correction issued August 19, 2008.

Signed and Sealed this

Twenty-third Day of September, 2008

JON W. DUDAS
*Director of the United States Patent and Trademark Office*